April 9, 1957   V. J. PRESTIPINO ET AL   2,787,905
SPRING LOADED THRUST LOADING DEVICE
Filed April 19, 1954   3 Sheets-Sheet 1
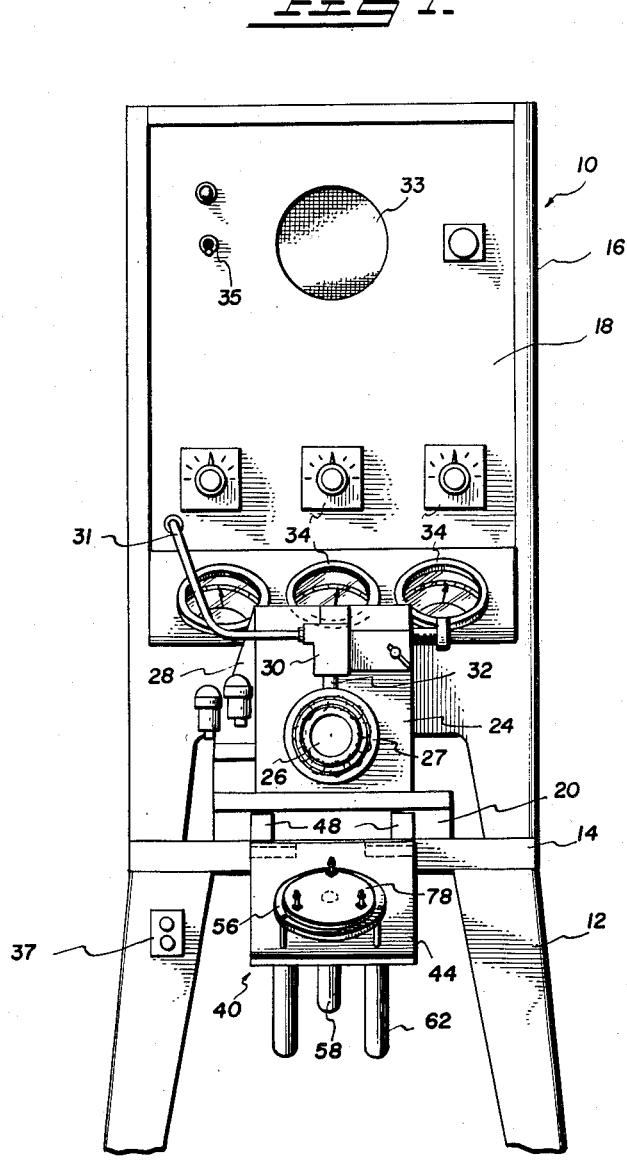
INVENTOR
BERNARD C. BOTTS &
VINCENT J. PRESTIPINO.
BY
ATTORNEY

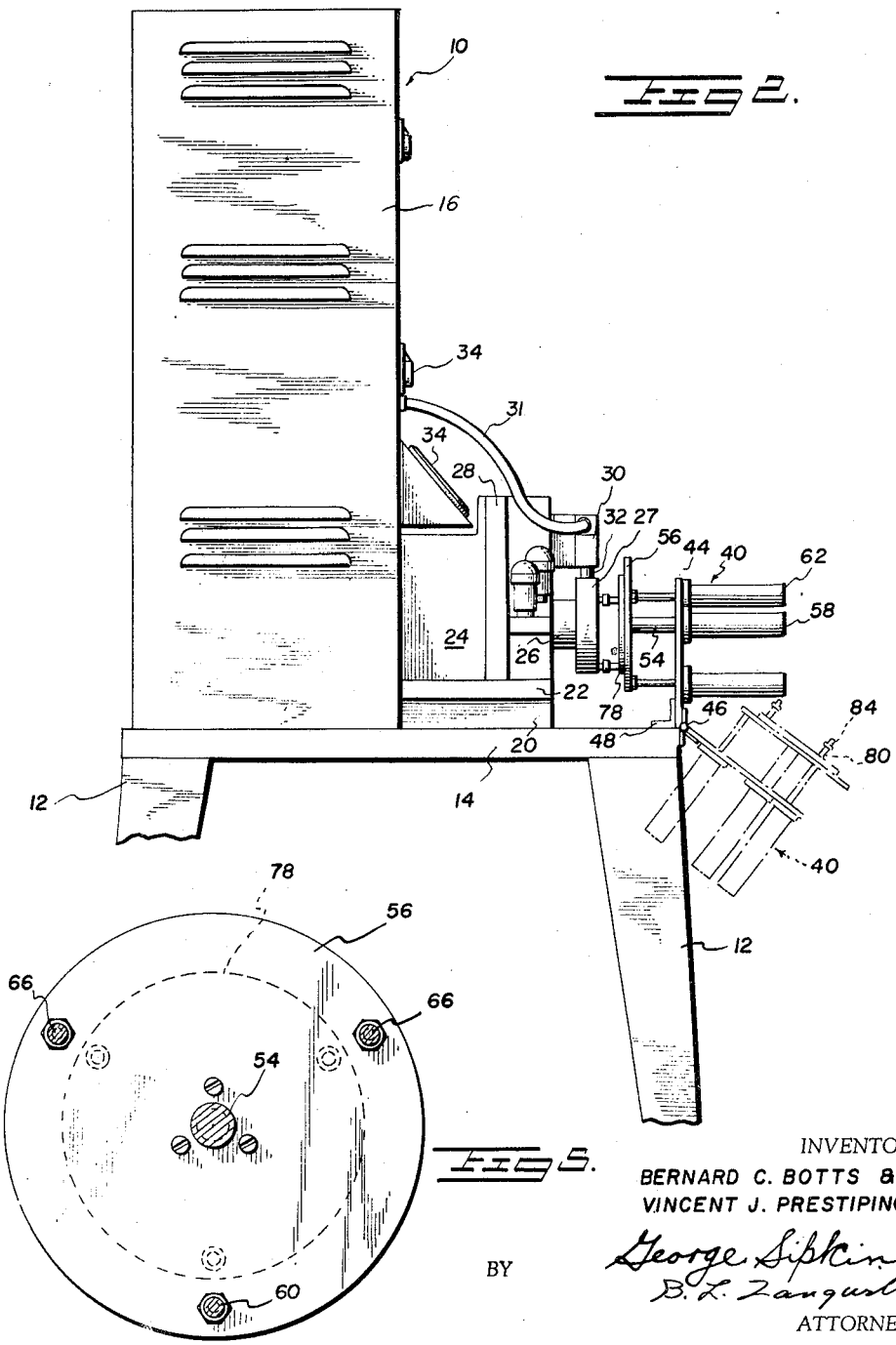

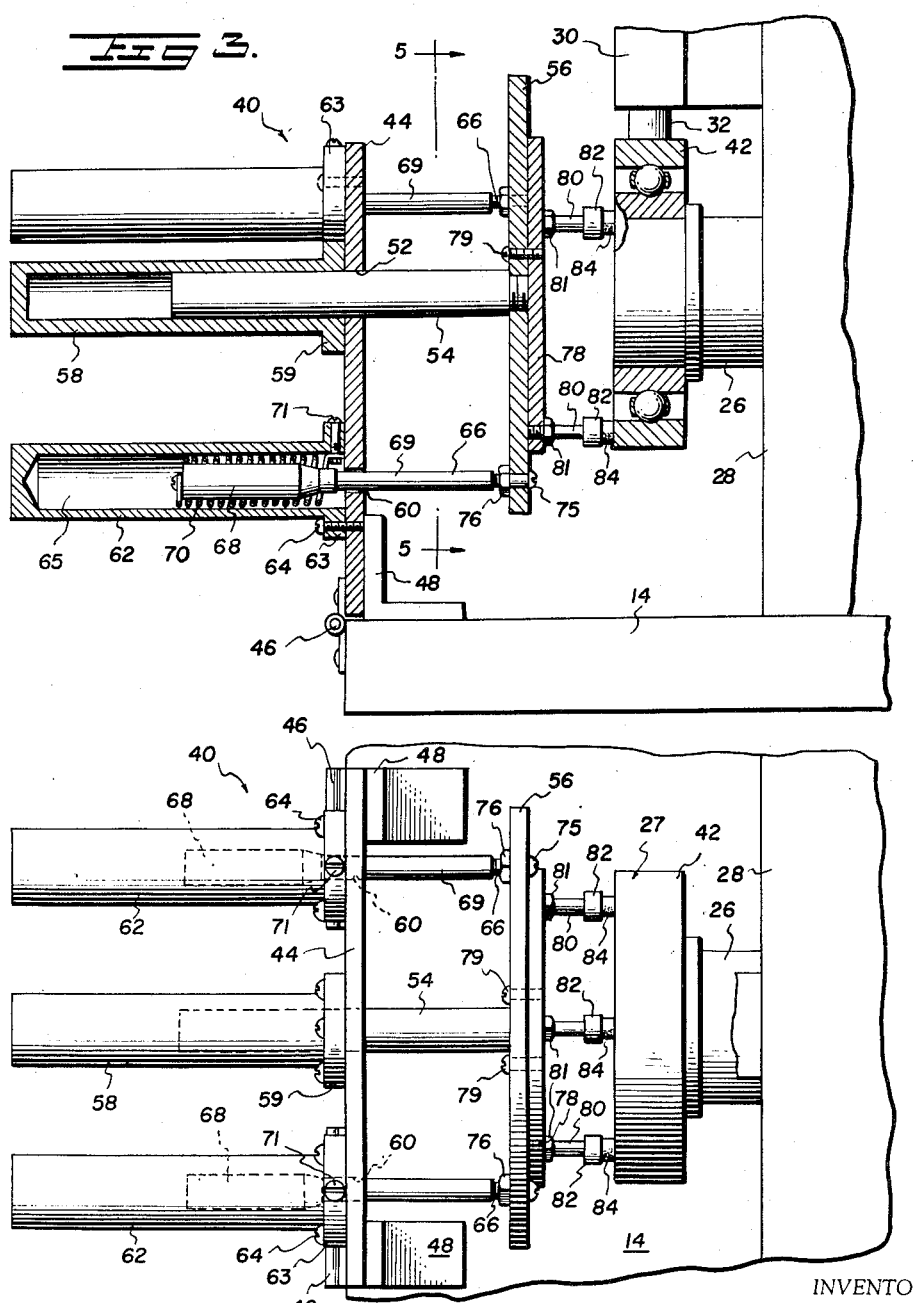

United States Patent Office 2,787,905
Patented Apr. 9, 1957

2,787,905

SPRING LOADED THRUST LOADING DEVICE

Vincent J. Prestipino, Bremerton, Wash., and
Bernard C. Botts, Bowie, Md.

Application April 19, 1954, Serial No. 424,289

13 Claims. (Cl. 73—67)

(Granted under Title 35, U. S. Code (1952), sec. 266)

The invention described herein may be manufactured and used by or for the Government of the United States of America for governmental purposes without the payment of any royalties thereon or therefor.

The present invention relates broadly to measuring and testing apparatus and more particularly, to a thrust loading device adapted for use with a non-friction bearing measuring and testing apparatus for anti-friction bearings.

In the measuring and testing of non-friction bearings of the ball and roller types, it has been customary to mount a bearing on a true-running spindle, manually apply an axial thrust load to the outer race of the bearing, and position a pick-up device in contact with the bearing to provide visual and aural indications of bearing vibration characteristics. The amount and type of vibrations generated in the bearing, as visually or aurally indicated, serve to define the degree and number of defects or imperfections in the bearing, and further permits the selection of bearings according to their noise-level operating characteristics. A machine of this type is known as an "Anderometer."

Due to the manual method of applying a thrust force to the bearings under test, which involves the operator applying a thrust force with his hand, it was extremely difficult to obtain consistent, accurate indications and, hence, comparative measurements of bearings under test. This results from the fact that the pressure or thrust load exerted by an operator varies and also because different operators apply different forces to the bearings. With differences in applied thrust loads, measured results obtained are unreliable and cannot be repeated by different operators. As a result only approximations of bearing qualities can be obtained by the manual-thrust-application methods.

In order to overcome the foregoing difficulties, the instant invention provides an axial thrust loading apparatus or preloader for placing a known and defined thrust load on each bearing under test. The preloader, which is adapted to be used with a bearing measuring and testing apparatus such as for instance an Anderometer, provides a thrust load which, besides being easily repeatable by the same or different operators, enables accurate and exact measurements of bearing quality to be made, free of the variables formerly encountered. Moreover, due to the exact loading characteristics of the preloader, measurements of such consistent and reliable nature are obtained that bearing standards which have heretofore been considered impractical under normal methods of bearing measurements, may now be set. Such standards may include quantitative criteria for special noise-level bearings and standards based upon vibration, noise-level, and the like.

Accordingly, it is one object of the present invention to provide means for permitting consistent, accurate measurements of bearing quality.

Another object of the present invention is the provision of a thrust loading apparatus for automatically applying a proper thrust load to a non-friction bearing under test upon placing the apparatus in operating position.

A further object of the invention is the provision of a bearing preloader adapted to apply the same uniform and defined thrust load on successive non-friction bearings placed under test.

Still another object is to provide an anti-friction bearing preloader which is adaptable to different sizes of bearings and is adjustable for varying the degree of thrust load applied to a bearing.

Still another object of the present invention is the provision of a bearing preloader which is easily and quickly adaptable to existent bearing measuring and testing apparatus.

A still further object of the present invention is to provide a bearing preloader of simple and durable construction which is accurate and reliable in operation, and easy to manipulate.

With these and other objects in view as will hereinafter more fully appear and which will more clearly be pointed out in the appended claims, reference is now made to the following description taken in connection with the accompanying sheets of drawings in which:

Figure 1 is a front elevational view showing a conventional Anderometer testing apparatus generally, the apparatus having a preferred embodiment of the present invention incorporated thereon;

Figure 2 is a side elevational view of the apparatus of Figure 1 showing, in full lines, the preloader in operating position and, in dotted lines, the preloader in retracted load-unload position;

Figure 3 is a fragmentary side view having parts broken-away and in section for showing the detailed construction of the preloader;

Figure 4 is a fragmentary plan view showing the preloader mounted in operating position; and Figure 5 is a sectional view taken substantially on the line 5—5 of Figure 3.

Referring now to the drawings wherein like reference characters designate like or corresponding parts throughout the several views, there is shown in Figures 1 and 2 a conventional Anderometer non-friction bearing test machine for measuring the velocity of radial vibrations of a bearing's outer race in microinches per radian of revolution of the bearing's driven inner race; and adaptable for measuring the noise-level of the bearing as well as detecting imperfections therein. Conventionally, the Anderometer includes a set of supporting standards 12, a horizontally positioned supporting apron or shelf 14 secured to standards 12, and an electronic equipment cabinet 16 having a dial and control panel 18. Carried on shelf 14, intermediate its ends, is a spindle bed 20 having its upper surface formed with rearwardly extended ways 22 for slidably mounting a spindle carriage 24. A true-running spindle 26 is longitudinally journaled in carriage 24 in such a manner that its forward end protrudes slightly therefrom to provide a mounting for the inner race of a bearing 27 to be tested. During operation, the mounting holds the inner race in a predetermined axial position. Usually, the protruding spindle end has a replaceable mounting head for accommodating bearings of different diameters. The opposite end of spindle 26 is connected to a spindle driving motor or the like (not shown) that is mounted on carriage 24 for rotating spindle 26 and hence, the inner race of bearing 27 during bearing tests, preferably at a constant known speed.

Adjustably positioned above bearing 27, on vertical ways 28 formed on the front portion of carriage 24, is a suitable velocity-type vibration pickup or transducer 30 having a pick-up head 32 which is adapted to engage the relatively stationary outer race of bearing 27. In testing, transducer 30 responds to the mechanical vibrations transmitted thereto by the bearing and generates electrical signals that correspond with the velocity of radial vibration of the bearing's outer race. These generated signals are fed, by lead 31, to an electronic circuit, in cabinet 16, including a loudspeaker 33 and a series of band-pass filter circuits, each of which is provided with suitable indicating instruments and controls 34.

As described thus far, the structure is conventional and operates to measure and test non-friction bearings in the following manner: Assuming that a bearing to be tested is mounted on spindle 26, an axial thrust load is applied to the bearing's outer race, power switch 35 is switched "on" for energizing the electronic circuits, power switch 37 is actuated for energizing the spindle drive motor, and the transducer 30 is vertically adjusted in a manner that its pickup head engages the outer race of bearing 27. As the spindle drive motor begins to rotate, it rotates the inner race of bearing 27 relative to the outer race, the outer race, meanwhile, being held stationary by the applied thrust load and the pick-up. Mechanical vibrations generated in the bearing's outer race are "picked up" by the pickup of transducer 30 in contact therewith. As a result electrical vibrations or signals which correspond with the mechanical vibrations set up in the outer race of the bearing are obtained. These signals are fed to the band-pass filter circuits to separate the vibration signals into frequency bands of low, medium, and high frequencies; the amplitude of each being indicated upon their respective indicating instrument. It will be apparent that by observing the indicating instruments, the kind and degree of defects or imperfections in the bearing may be determined so as to separate the low frequency or "growling" bearings from the high frequency or "squealing" bearings. The aural sound generated by loudspeaker 33 aids in detecting scratched, dirty, and dented bearings as well as other defects having intermittent and random noise characteristics.

The indicators of the band-pass filter circuits, as indicated above, provide a quantitive indication of bearing quality with respect to actual field service under the axial thrust load applied to the bearing under test. To enable an operator or operators of the Anderometer to apply a known, defined and repeatable thrust load to the bearing under test, so as to provide consistent, uniform and accurate bearing measurements of such an order that rigid standards of bearing quality may be established, an adjustable axial thrust loading apparatus or preloader 40, comprising the preferred embodiment of the instant invention, is provided for use in conjunction with a bearing measuring and testing apparatus such as described.

The preloader, as best shown in Figs. 3-5, comprises an adjustable thrust loading apparatus for applying an axial thrust load to the outer race 42 of bearing 27 and includes a supporting member, preferably in the form of a base plate 44, which is guidably movable relative to the bearing under test. Base plate 44 in the preferred embodiment, is formed generally rectangular in shape and is secured on its lower edge to the top forward end of shelf 14 by a pair of spaced flap hinges 46 having their flaps rigidly secured to shelf 14 and to the lower ends of base plate 44, respectively. The arrangement is such that the preloader may be pivoted from a vertical operating position to a forward, retracted position for adjustment thereof and the loading and unloading of bearings on spindle 26.

In order to accurately position the base plate relative to bearing 27 during the application of a thrust load thereto, a pair of stops 48 are provided, one of which is positioned adjacent each outer end portion of base plate 44. Each of the stops 48 preferably comprises an L-shaped member formed from bar stock or the like having one leg secured to shelf 14 and the other leg extending upwardly such that its forward side engages and defines the rearwardmost travel of base plate 44. For reasons which will hereinafter become apparent, the stops are positioned such that when engaged by base plate 44, the vertical plane of base plate 44 is parallel to the plane of bearing 27.

Formed substantially centrally of base plate 44 and axially aligned with spindle 26 when the base plate is in its upward operating position, is a large guide bore 52 that slidably receives, by a snug sliding-fit, a center guide or piston 54. Piston 54 comprises an elongated cylindrical rod having its rearward or outer end formed with a reduced threaded portion and functions with a guide cylinder 58 for retaining the preloader components in proper aligned relationship. For this purpose, the reduced threaded portion is rigidly secured to and substantially centrally of an intermediate platform plate 56 as by threading, while the forward portion of piston 54 enters and slidably travels within the hollow guide cylinder 58. The guide cylinder 58 has its forward end closed and is provided with an annular securing flange 59 adjacent its rearward end for fixedly securing the cylinder to the forward side of base plate 44 as by bolts or the like. Preferably, the cavity of cylinder 58 has a diameter of such size as to present a snug sliding-fit to center guide 54 and is axially aligned with bore 52 so that the internal surfaces of bore 52 serve as a continuing guide for the piston. This sliding fit of the guide and bore acts to prevent lateral movement of guide 54 and thus, acts to retain plate 56 in a substantially parallel plane with respect to the vertical planes of base plate 44 and bearing 27 when plate 44 is in its upward, operating position.

Radially spaced around guide bore 52 and formed in base plate 44 are a series of three plunger bores 60, each of which is enclosed on the forward side of plate 44 by a plunger guide 62 that functions to carry and retain an aligning stud 68 and an associated tension spring 70 in position. Each of the plunger guides, which are similar in construction, preferably comprises an elongated cup-shaped or cylindrical housing having its forward end closed for defining an enlarged cavity 65 therein. An annular securing flange 63 is integrally formed on the rearward end of plunger guide 62 and is adapted to fit flush against the forward side of plate 44 in axially aligned relationship with its respective bore 60. The guides are secured in this position by suitable means such as bolts 64 passing through flange 63 and into plate 44. Carried within guides 62 and extending outward therefrom through bores 60 are a series of three aligning studs or plungers 66. As best shown in Fig. 3, each of the studs 66 is formed with an enlarged inner portion 68 slidably carried within cavity 65 of guides 62 and an integral, reduced outer portion that slidably coacts with bore 62 and extends outwardly from plate 44. Also carried within cavity 65 and functioning to apply a thrust force to studs 66, is a calibrated coil spring 70 having its extreme ends formed with suitable securing loops. Spring 70 is concentrically mounted on portion 68 and has its inner loop secured to the extreme inner end of stud 66 and its outer loop attached by a suitable bolt 71 or the like to the annular flange 63 of guide 62. The spring acts to exert an outward thrust on its respective stud 66 whenever the studs are pressed into engagement with a rigid object and the springs consequently tensioned. The extreme outer ends of reduced portions 69 are secured to platform plate 56 by suitable means for applying the thrust force to plate 56 and to aid in aligning the plate relative to base plate 44. Preferably, the studs are adjustably connected to the platform plate so as to adjust the thrust force exerted by spring 70 upon studs 68. For this purpose, each stud is provided with an axially threaded bore in its extreme outer end which coacts with a securing bolt 75 that passes through plate 56. As such, by turning bolts 75, the relative distance between plates 44 and 56 may be adjusted and thus, the initial tension on calibrated springs 70 determined. If desired, lock nut 76 may be provided to secure the stud in adjusted position.

The axial thrust force from platform plate 56 is applied directly to the outer race of bearing 27 through a thrust assembly including a bearing holding plate 78, a series of three friction pad holders 80 mounted on plate 78, and friction pads 84 carried by respective pad holders 80. The thrust assembly is mounted on the outer side of plate 56 and as described below is used in conjunction with a specific size non-friction bearing. The bearing holding plate 78 of the assembly preferably comprises a substantially flat plate member which is adapted to be seated against and removably secured to platform plate 56 as by bolts 79 or the like. Since various sized bearings are measured with the instant invention in combination with an Anderometer, it is desirable that several thrust assemblies for accommodating different sized bearings be provided and that each be interchangeable on platform plate 56. To accomplish this, each bearing holding plate 78 is provided with similarly spaced securing bores so that they may be secured by bolts 79 to the same securing bores formed in platform plate 56.

Radially and equally spaced on plate 78 with respect to the axis of spindle 26, are a series of three threaded bores 81, each of which is adapted to adjustably receive one end of a friction pad holder 80. In forming bores 81 in bearing holding plate 78, the radius of each bore relative to the axis of spindle 26 is fixed equal to the outer race radius of bearing 27 so that when the preloader is placed in operating position, the friction pads mounted on holders 80 will engage the rim of outer race 42. The pad holders, which are carried in bores 81 are preferably equal in length and are formed on one end with an integral reduced portion that is threaded on its inner end. This threaded end is adapted to be adjustably secured in bores 81 as by a suitable lock nut. The outer end of pad holders 80 is formed with an enlarged integral cup 82 for receiving and retaining a cylindrical friction pad 84 in position. The pads function to engage the outer race of the bearing. While any suitable type of friction pads may be employed to engage the outer race, the pads are preferably cylindrical in shape and are formed of a suitable resilient material such as natural rubber so as to isolate generated vibrations in bearing 27 from the body of the machine. If desired, friction pads 84 may be secured in position in cups 82 as by glue or the like.

It will be noted that pad holders 80 must be positioned on bearing holding plate 78 in a manner that their pads engage the rim of the outer bearing race. Since different sized bearings will normally have different diameters, it is necessary to adjust the relative position of the holders on plate 78. For convenience, various thrust assemblies, which are interchangeable in plate 56 as indicated above, are provided. These assemblies are structurally identical to the other with the exception that their pad holders are spaced in accordance with the size of bearing to be tested.

In the initial operation of an Anderometer having the instant invention incorporated therein, the preloader is placed in its forward retracted position, a bearing to be tested is mounted on spindle 26 and the Anderometer energized through switches 35 and 37. While the preloader is in its retracted position the desired thrust assembly is secured to platform plate 56; the thrust assembly being selected in accordance with the outer race diameter of the bearing to be measured. After securing the thrust assembly in position, friction pads 84 are longitudinally adjusted in bores 81 such that the bearing surface of each pad is in the same respective plane. Bolts 75 are then adjusted to vary the initial tensional force applied to spring 70 to provide the axial thrust load desired to be placed on bearing 27 by the preloader. It should be noted that after this adjustment, no thrust force will be exerted by springs 70 until the preloader is placed against bearing 27; however, by adjusting bolts 75, the thrust load exerted by the preloader, when in operating position, may be selectably varied from 2 to 30 lbs. This range, however, is not to be considered as limiting inasmuch as the thrust load may be further varied by replacing springs 70 with other springs having different tensional strengths. After these initial adjustments, the preloader is in operable condition for placing a known and defined thrust load upon each bearing to be measured.

To apply the desired thrust load to a bearing undergoing tests, the preloader is manually pivoted in a rearwardly direction, about hinges 46, until each of the friction pads 84 engage the outer race of bearing 27. Inasmuch as the race is substantially fixed and the pads are prevented from further movement, the continued movement of preloader 40 will be taken up by a tensioning of springs 70. This will cause a thrust force or load to be applied to bearing 27. Further movement of the preloader will place additional thrust loads upon the bearing until such time that plate 44 engages stop 48 whereupon the total desired axial thrust load, as determined by the aforesaid adjustments, is applied to bearing 27. It will be apparent that with base plate in the upward operating position, each of the three friction pads will engage the outer race of bearing 27 and will be spaced from the others by a 120° interval such that the pads will apply a distributed and uniform thrust load around the bearing. The indicator readings of the Anderometer are then taken and the aural sound from loudspeaker 33 noted. After the readings of the indicators have been recorded, preloader 40 is pivoted to its retracted position, switch 37 is deenergized for stopping spindle 26, bearing 27 is removed from spindle 26 and a second bearing to be measured and tested substituted therefore. The apparatus is then in condition for measuring and testing a second bearing. Since the preloader, upon initial adjustment, will apply the same known and defined thrust load to each successive bearing measured and tested, uniform and accurate indications of bearing quality are provided with such an order that rigid standards of bearing quality may be established.

While it will be apparent that the preferred embodiment of the invention herein disclosed is well calculated to fulfill the objects above stated, it will be appreciated that the invention is susceptible to modification, variation and change without departing from the proper scope of fair meaning of the subjoined claims. In particular, it will be apparent that the preloader may be moved relative to the bearing under test by other and different means than the pivoted hinge arrangement of the instant embodiment. As an example, the preloader may be retracted by the use of conventional sliding, raising or lowering devices; the only essential requirement being that the preloader be accurately positioned relative to the bearing under test and be capable of retraction for changing bearings and permitting of adjustments. Moreover, the thrust load may be developed through the medium of a simple hydraulic system, compressed air, or other similar means, and the loading may be applied to the bearing through a unitary platform plate or directly to the bearing.

What is claimed and desired to be protected by the Letters Patent of the United States is:

1. In combination with a bearing measuring and testing apparatus having a spindle and a bearing mounted on said spindle, means for applying a defined axial thrust load to said bearing including a base member, support means supporting said base member adjacent said spindle means on said support means enabling said base member to be movable relative to said spindle, means carried on said base member engaging said bearing when the base member is moved to a position substantially perpendicular to the axis of said bearing, and biasing means between said base member and said last named means for exerting a defined thrust force on said last named means when in engagement with said bearing, said force being adapted to be transmitted to said bearing.

2. In combination with a bearing measuring and testing apparatus having a driven spindle and a bearing mounted on said spindle to be measured and tested, means comprising a preloader for applying a preset axial thrust load to said bearing, said preloader including a base member supported adjacent said bearing and movable relative to said bearing, a platform member, means carried by said platform member for engaging said bearing when the base member is moved relative to said bearing, and biasing means located on said base member and operatively connected with said platform member for exerting said preset thrust force to said platform member and said second named means.

3. In combination with a non-friction bearing testing apparatus having a driven spindle and a bearing mounted on said spindle to be tested, a preloader for applying a preset axial thrust load to said bearing including a base member supported adjacent said bearing and movable relative to said bearing, a platform member, means removably carried by said platform member for engaging said bearing when the base member is moved relative to said bearing, and adjustable biasing means attached to said base member and operatively connected with said platform member for exerting said preset thrust force to said platform member and said first named means.

4. In an apparatus as defined in claim 3 but further characterized by said first named means comprising a first member removably attached to said platform member, and a plurality of individual bearing engaging membars each of which are adjustably connected to said first member and operative to engage said bearing.

5. In an apparatus as defined in claim 4 but further characterized by said individual bearing engaging members comprising elongated pad holders having a friction pad on one end thereof for engaging said bearing.

6. In combination with a non-friction bearing testing apparatus having a driven spindle and a bearing mounted on said spindle to be tested, a preloader for applying a defined axial thrust load to said bearing member including, a base member supported adjacent said bearing and movable relative to said bearing, means carried on said base member for engaging said bearing when the base member is moved towards said bearing, and means for applying a thrust force to said first named means including a resilient means attached to said base member, and a plunger means connected to said first named means and said resilient means.

7. In an apparatus as defined in claim 6 but further characterized by said plunger means being adjustably connected to said first named means, and said first named means including a plurality of adjustable bearing engaging members.

8. In combination with a non-friction bearing testing apparatus having a driven spindle and a bearing mounted on said spindle to be tested, a preloader for applying a defined axial thrust load to said bearing including a base member supported adjacent said bearing and movable relative to said bearing, an intermediate member slidably supported on said base member, means removably carried by said intermediate member for engaging said bearing when the base member is moved relative to the bearing, and means for applying a thrust force to said first named means including a resilient member secured to said base member, and a plunger member connected to said intermediate member and said resilient member.

9. In an apparatus as defined in claim 8 but further characterized by said first named means including a first member removably secured to said intermediate member, and a plurality of individual bearing engaging members each of which are adjustably connected to said first member and operative to engage said bearing.

10. In combination with a non-friction bearing testing apparatus having a driven spindle and a bearing mounted on said spindle to be tested, a preloader for applying a defined thrust load to said bearing including, a base member supported adjacent said bearing and movable relative to said bearing, an intermediate member, cylinder means carried on said base member, a piston means secured to said intermediate member and slidable in said cylinder means for slidably retaining said intermediate member in predetermined aligned relationship with said base member, means removably carried by said intermediate member and operative to engage said bearing when the base member is moved relative to said bearing, said last named means including a first member removably attached to said intermediate member, and a plurality of individual bearing engaging members each of which is adjustably connected to said first member and have a resilient pad operative to engage said bearing, and means for applying a thrust force to said intermediate member and said individual bearing engaging members including a resilient member secured to said base member, and a plunger member connected to said intermediate member and said resilient member.

11. In combination with a non-friction bearing testing apparatus having a driven spindle and a bearing mounted on said spindle to be tested, a preloader for applying a defined thrust load to said bearing including, a base member pivotedly supported on said apparatus and movable from a retracted inoperative position to a rearwardly upward position in operative relation with said bearing, an intermediate member, a cylinder member carried on said base member, a piston member secured to said intermediate member and slidable in said cylinder member for slidably retaining said intermediate member in predetermined aligned relationship with said base member, a thrust assembly removably carried on said intermediate member and operative to engage said bearing when the base member is pivoted to said operative position, said thrust assembly comprising a first member removably attached to said intermediate member, and a plurality of individual bearing engaging members each of which is adjustably connected to the first member and having a resilient pad operative to engage said bearing, and means for applying a thrust force to said intermediate member and said thrust assembly including an elongated spring member secured to said base member, and a plunger member adjustably connected on one end to said intermediate member and secured on its other end to said spring member.

12. An apparatus for exerting an axial thrust load on a member to be tested comprising a preloader having a base member pivotedly supported for movement relative to said member from a retracted inoperative position to a vertical load exerting position, an intermediate plate member, a guide cylinder carried on said plate member, an elongated piston having one end secured to the intermediate plate member and the other end slidable in said guide cylinder for slidably retaining said intermediate plate member in predetermined aligned relationship with said base member, a thrust assembly removably carried on said intermediate plate member and operative to engage said member to be tested when the base member is in its vertical load exerting position, said thrust assembly comprising a first member removably attached to said intermediate plate member, and a plurality of individual engaging members each of which is adjustably connected to the first member in predetermined spaced relation to each other, and means for applying a thrust force to said intermediate plate member and said engaging members including a plurality of elongated spring members spaced around the guide cylinder each of which have one end secured to said base member, and a plurality of plunger members, each of said plunger members being adjustably connected on one end to said intermediate plate member and on its other end to the other end of one of said spring members.

13. In combination with an apparatus for measuring and testing ball bearings having a driven spindle adapted to rotate one of the races of said bearings, means for applying to the other of the races of said bearings under test an identical preset axial thrust load, said means comprising a base member, means adapted to engage said other of the races of said bearings under test, means connected to said base member and said last named means for biasing said last named means a set distance from said base member, means for enabling movement of said base member adjacent said bearings whereby said bearing engaging means engages said bearing under test, and means for limiting the movement of said base member, the movement of said base member to said limiting means acting against said biasing means, whereby the reaction of said biasing means to said movement sets up a thrust force which is transmitted to the bearing under test.

References Cited in the file of this patent

UNITED STATES PATENTS

| | | |
|---|---|---|
| 1,491,050 | Lutz | Apr. 22, 1924 |
| 1,992,453 | Vincent | Feb. 26, 1935 |
| 2,009,997 | Germond | Aug. 6, 1935 |
| 2,398,156 | Puterbaugh et al. | Apr. 9, 1946 |
| 2,427,364 | McKendry | Sept. 16, 1947 |
| 2,468,648 | Abbott et al. | Apr. 26, 1949 |
| 2,623,384 | Pigott | Dec. 30, 1952 |

FOREIGN PATENTS

| | | |
|---|---|---|
| 395,856 | Germany | May 19, 1924 |